United States Patent [19]

Frauenglass et al.

[11] 3,757,828
[45] Sept. 11, 1973

[54] AIR-IMPERMEABLE SURFACES COATED WITH AN ADHESIVE COMPOSITION

[75] Inventors: Elliott Frauenglass, Newington, Conn.; William E. Cass, Wayland, Mass.

[73] Assignee: Loctite Corporation, Newington, Conn.

[22] Filed: June 8, 1971

[21] Appl. No.: 150,938

Related U.S. Application Data

[62] Division of Ser. No. 709,228, Feb. 29, 1968, Pat. No. 3,625,875.

[52] U.S. Cl. ............... 138/145, 117/122 R, 151/7, 151/14.5, 260/17 R, 260/885
[51] Int. Cl. .................................... F16l 9/14
[58] Field of Search ............... 117/122 R, 37; 260/17, 885; 85/41, 32; 151/7, 14.5; 138/145

[56] References Cited
UNITED STATES PATENTS

| 3,300,547 | 1/1967 | Gorman et al. | 260/89.5 X |
|---|---|---|---|
| 2,895,950 | 7/1959 | Krieble | 156/305 X |
| 3,332,816 | 7/1967 | Kalinowski | 260/885 X |
| 3,203,941 | 8/1965 | Krieble | 117/132 X |
| 3,043,820 | 7/1962 | Krieble | 260/45.95 X |
| 3,218,305 | 11/1965 | Krieble | 260/86.7 X |
| 3,046,262 | 7/1962 | Krieble | 156/326 X |
| 3,041,322 | 6/1962 | Krieble | 156/331 X |
| 3,239,477 | 3/1966 | Karo | 260/23.5 |
| 3,249,656 | 5/1966 | Kalinowski | 260/885 |
| 3,260,637 | 7/1966 | Von Bramer | 260/17 X |
| 2,742,443 | 4/1956 | Diggles | 260/17 |

Primary Examiner—William D. Martin
Assistant Examiner—Bernard D. Pianalto
Attorney—J. Rodney Reck and William J. Daniel

[57] ABSTRACT

Sheet coating compositions which are adhesive in nature can be made from a thermoplastic polymer by plasticizing the polymer with an anaerobic adhesive, i.e., a mixture of a polymerizable liquid acrylate ester monomer and a peroxy polymerization initiator therefor. Such compositions are used effectively as preapplied coatings for air-impermeable surfaces in sealing and bonding applications.

11 Claims, No Drawings

AIR-IMPERMEABLE SURFACES COATED WITH AN ADHESIVE COMPOSITION

CROSS-REFERENCE TO RELATED APPLICATION

The application is a division of application Ser. No. 709,228, filed Feb. 29, 1968, now U.S. Pat. No. 3,625,875.

BACKGROUND OF THE INVENTION

Adhesives are playing a progressively more important role in the production and maintenance portions of today's industry. As used herein, "adhesive" frequently refers not only to high strength bonding materials, but also to related materials which serve primarily to seal or lock adjacent surfaces (such as threadlocking compounds for nuts and bolts) where comparatively low adhesion is adequate. One of the most important types of adhesives, particularly to the metalworking industry, is the class of anaerobic adhesives. These are adhesives which remain liquid in the presence of air (oxygen) but which polymerize upon the exclusion of air to form hard, durable resins with excellent adhesive properties. Since air is automatically excluded between mating surfaces of metal and other non-porous parts, these adhesives are particularly useful in applications involving non-porous materials.

As with other adhesive materials, anaerobics conventionally are applied in the liquid state to allow the adhesive to contact and "wet" the surfaces to be bonded. The need to apply adhesive at or near the time of intended use has been a limitation on these products. Fully acceptable preapplied or preformed adhesives which will cure at room temperature have not been prepared to date. While the concept of preapplied adhesives has been recognized as a desirable objective, an acceptable solution to the many problems involved has not been found. Attempts have been made to encapsulate two-part adhesives, such as epoxies, and to apply them to parts prior to assembly. While this does permit preapplication of adhesives to parts, totally acceptable results have not been achieved. The encapsulation process is quite cumbersome and the attachment of capsules presents certain inherent problems, such as risk of loss of the capsules from the surface during storage or shipment. Also, mistreatment prior to use can lead to loss of adhesive due to premature rupturing of the capsules.

A coating having adhesive properties which avoided the above-described problems of the prior art, and which could be firmly affixed to one of a plurality of surfaces destined for assembly would be an extremely novel and useful product. Likewise, a sheet material or coating material which possessed anaerobic adhesive characteristics would be a novel and useful product.

THE INVENTION

This invention relates to compositions which are substantially non-flowable at about 75°F., but which possess bonding capabilities in numerous applications. More specifically, it relates to a thermoplastic polymer which is plasticized with a polymerizable liquid anaerobic adhesive. It also concerns a thermoplastic polymer which is plasticized with at least about 5 percent by weight of the total composition, of an adhesive system which comprises a mixture of a polymerizable liquid acrylate ester monomer and a peroxy polymerization initiator. In addition, the invention contemplates a thermoplastic sheet or coating material having adhesive properties which comprises a thermoplastic polymer containing at least about 5% by weight of the total composition, of the above-described liquid adhesive system.

The invention also includes the method of producing adhesive properties in a thermoplastic sheet or coating material which comprises distributing uniformily throughout the thermoplastic material a liquid adhesive system which comprises a mixture of an acrylate ester monomer and a peroxy polymerization initiator. Also included within the invention is the process of dissolving in a volatile solvent the combination of: (A) a thermoplastic polymer; and (B) a polymerizable acrylate ester monomer and a peroxy polymerization initiator; and then evaporating the solvent to produce a thermoplastic composition having adhesive properties.

An additional aspect of the invention involves a threaded pipe or fastener having an adhesive thermoplastic material as described above deposited on at least a part of the threaded portion thereof.

DISCUSSION OF THE INVENTION AND ITS PREFERRED EMBODIMENTS

The monomers contemplated for use in the invention disclosed herein are polymerizable acrylate esters. As used herein, "acrylate esters" includes alpha-substituted acrylate esters, such as the methacrylate, ethacrylate, and chloroacrylate esters. Monomers of this type, when mixed with a peroxy initiator as described below, form desirable adhesives of the anaerobic type.

Anaerobic adhesives are those which remain stable in the presence of air (oxygen), but which when removed from the presence of air will polymerize to form hard, durable resins. This type of adhesive is particularly adaptable to the bonding of metals and other non-porous or non-air permeable materials since they effectively exclude atmospheric oxygen from contact with the adhesive, and therefore the adhesive polymerizes to bond the surfaces together. Of particular utility as adhesive monomers are polymerizable di- and other polyacrylate esters since, because of their ability to form cross-linked polymers, they have more highly desirable adhesive properties. However, monoacrylate esters can be used, particularly if the non-acrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate, glycidyl methacrylate cyclohexyl acrylate and furfuryl acrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

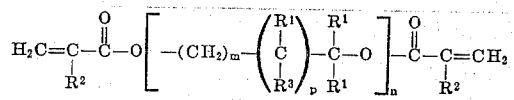

wherein $R^1$ represents a radical selected from the group consisting of hydrogen, lower alkyl of from one to about four carbon atoms, hydroxy alkyl of from one to about four carbon atoms, and

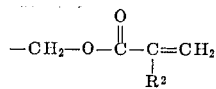

$R^2$ is a radical selected from the group consisting of hydrogen, halogen, and lower alkyl of from one to about four carbon atoms; $R^3$ is a radical selected from the group consisting of hydrogen, hydroxyl, and

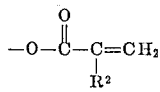

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri- and tetraethylene glycol dimethacrylate, dipropylene glycol dimethacrylate, polyethylene glycol dimethacrylate, di (pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers, such as polyhydric phenols, quinones, etc. are included. As used herein the term "polymerizable polyacrylate ester monomer" includes not only the foregoing monomers in the pure and impure state, but also those other compositions which contain those monomers in amounts sufficient to impart to the compositions the polymerization characteristics of polyacrylate esters. It is also within the scope of the present invention to obtain modified characteristics for the cured composition by the utilization of one of more monomers within the above formula with other unsaturated monomers, such as unsaturated hydrocarbons or unsaturated esters.

The preferred peroxy initiators for use in combination with the polymerizable acrylate or polyacrylate esters described above are the hydroperoxy polymerization initiators, and most preferably the organic hydroperoxides which have the formula $R^4OOH$, wherein $R^4$ generally is a hydrocarbon radical containing up to about 18 carbon atoms, preferably an alkyl, aryl or aralkyl radical containing from one to about 12 carbon atoms. Typical examples of such hydroperoxides are cumene hydroperoxide, tertiary butyl hydroperoxide, methyl ethyl ketone hydroperoxide and hydroperoxides formed by the oxygenation of various hydrocarbons, such as methylbutene, cetane and cyclohexene. Other organic substances, such as ketones and esters, including the polyacrylate esters represented by the above general formula, can be oxygenated to form hydroperoxy initiators. However, other peroxy initiators, such as hydrogen peroxide or materials such as certain organic peroxides or peresters which hydrolyze or decompose to form hydroperoxides frequently can be used. In addition, Belgium Patent 692,031 describes peroxides having a half-life of less than 5 hours at 100°C as suitable in somewhat related anaerobic systems.

The peroxy initiators which are used commonly comprise less than about 20 percent by weight of the combination of monomer and initiator since above that level they begin to affect adversely the strength of the adhesive bonds which are formed. Preferably the peroxy initiator comprises from about 0.1 percent to about 10 percent by weight of the combination.

Other materials can be added to the mixture of polymerizable acrylate ester monomer and peroxy initiator, such as quinone or polyhydric phenol stabilizers, tertiary amine or imide accelerators, and other functional materials, such as thickeners, coloring agents, etc. These additives are used to obtain commercially desired characteristics, i.e., suitable viscosity and shelf stability for extended periods (e.g., a minimum of one month). The presence of these additives is particularly important when peroxy initiators other than organic hydroperoxides are used. For a complete discussion of the anaerobic systems and anaerobically curing compositions, reference is made to the following United States Patents: U.S. Pat. No. 2,895,950 to Vernon K. Krieble, issued July 21, 1959; U.S. Pat. No. 3,041,322 to Vernon K. Krieble, issued June 26, 1962; U.S. Pat. 3,043,820 to Robert H. Krieble, issued July 10, 1962; U.S. Pat. No. 3,046,262 to Vernon K. Krieble, issued July 24, 1962; U.S. Pat. No. 3,203,941 to Vernon K. Krieble, issued Aug. 31, 1965; U.S. Pat. No. 3,218,305 to Vernon K. Krieble, issued Nov. 16, 1965; and U.S. Pat. No. 3,300,547 to J. W. Gorman et al, issued Jan. 24, 1967.

Thermoplastic polymers, as used herein, refers to the generally accepted class of polymeric materials which is characterized by a substantially linear molecular structure with little or no cross-linking between molecules of the polymer. They possess the properties of flexibility and formability and are distinguished from the second class of plastic materials, thermoset polymers, in these respects. Thermoset resins are highly cross-linked polymers which possess, as a general rule, great strength, hardness, brittleness and lack of formability compared to the thermoplastic resins.

To be useful in the invention disclosed herein, the anaerobic adhesive system must be reasonably compatible with the thermoplastic polymer; specifically, since the anaerobic adhesive must serve to "plasticize" the thermoplastic polymer, it has been found that the anaerobic adhesive system must be slightly soluble in the thermoplastic polymer. Since the liquid anaerobic adhesive which is used to plasticize the thermoplastic polymer is the component of the final product which provides the adhesive properties, it should be sufficiently soluble in the thermoplastic polymer to provide the required degree of adhesion. If low adhesion will suffice in the intended end use of the product (as when the material will serve primarily as a sealant), levels of anaerobic adhesive as low as about 5 percent by weight of the adhesive thermoplastic composition have been found adequate. However, since higher adhesion generally is required for most applications, it is preferable that at least about 10 percent anaerobic adhesive by weight of the adhesive thermoplastic composition is used. At this level much more desirable adhesive properties are imparted to the final product. Where high levels of adhesion are required, as in structural bonding applications, preferably at least about 25 percent anaerobic adhesive by weight of the adhesive thermoplastic composition is used.

The upper limit for liquid anaerobic adhesive content in the product of this invention is determined by the intended use for the final product, and by the nature of the thermoplastic polymer which is used. With greater demands for adhesion in the use of the product of this invention, the required amount of liquid anaerobic adhesive will increase. However, the amount of liquid anaerobic adhesive used cannot be so great so as to become the dominant component of the product, i.e., the final product must not be flowable at 75°F. Preferably, the final product is not flowable at 100°F. since temperatures of this magnitude frequently are encountered during storage and shipment. The basic characteristics of the thermoplastic polymer must be retained to provide structural integrity in the final product; without such structural integrity, the benefits of the invention disclosed herein are not achieved. As the content of liquid anaerobic adhesive increases, the strength and durability of the products of this invention will decrease and greater care must be used in handling the products. But as long as the product retains its non-flowable characteristic, the benefits of this invention still are present.

The upper limit at which the above-described non-flowable characteristic can be retained will depend upon the nature of the specific components used, and primarily upon the nature of the thermoplastic polymer. Thermoplastic resins with higher melting points and with greater degrees of intermolecular attraction generally possess superior structural integrity and can be used in conjunction with higher percentages of liquid anaerobic adhesive. Also, for a given type of thermoplastic polymer, the higher molecular weight polymers produce products (such as sheets and coatings) with greater structural integrity and therefore can be used with a greater amount of liquid anaerobic adhesive than their low molecular weight counterparts.

It has been found that a certain number of thermoplastic polymers can be used to produce adhesive thermoplastic compositions within the scope of this invention which contain as much as about 90 percent by weight liquid anaerobic adhesive. In particular, high molecular weight cellulose derivatives, such as cellulose esters and cellulose ethers, have been found to be useful in this respect. With these few exceptions, it has been found that as a general rule the liquid anaerobic adhesive cannot comprise more than about 80 percent by weight of the final product, and preferably should not comprise more than about 60 percent by weight of the final adhesive thermoplastic composition in order to insure adequate handling strength and durability in the final product. The optimum amount of liquid anaerobic adhesive for use with any particular thermoplastic polymer for any specific application easily can be determined with a minimum of routine testing, using the disclosures herein as guidelines, particularly in light of the numerous examples which are proved hereinafter. Such testing is a simple matter for the average skilled worker in the art.

The specific polymer used in conjunction with the liquid anaerobic adhesive may be any such polymer which meets the compatibility requirement discussed above, i.e., at least 5 percent by weight of the anaerobic adhesive must be soluble in the thermoplastic polymer. As typical examples of the numerous thermoplastic polymers which can be used in conjunction with liquid anaerobic adhesives to produce the products of this invention, the following list is provided:

a. Polyacrylates, such as polymethyl acrylate, polyethyl methacrylate, polymethyl chloroacrylate, and polypropyl methacrylate. Preferably the polyacrylates have an average molecular weight between about 5,000 and about 500,000.

b. Cellulose esters, such as cellulose acetate, cellulose acetate butyrate and cellulose acetate propionate. Preferably the cellulose esters have an average molecular weight between about 50,000 and about 500,000.

c. Butadiene-styrene copolymers, particularly such copolymers containing from about 20 percent to about 80 percent butadiene. The preferred average molecular weight is from about 5,000 to about 500,000.

d. Acrylonitrile-butadiene-styrene copolymers, particularly such copolymers containing from about 15 percent to about 35 percent acrylonitrile and from about 15 percent to about 35 percent butadiene. The preferred average molecular weight is from about 5,000 to about 100,000.

e. Polyvinyl chloride, preferably having an average molecular weight between about 10,000 and 500,000.

f. Copolymers of vinyl chloride or vinylidine chloride and vinyl acetate, preferably containing from about 5 percent to about 40 percent vinyl acetate. The preferred average molecular weight is from about 10,000 to about 500,000.

g. Cellulose ethers such as ethyl cellulose, hydroxyethyl cellulose, and methyl methyl cellulose, preferably containing from about 1.5 to about 2.5 ethyl, hydroxyethyl or methyl groups per glucose residue. The preferred average molecular weight is from about 50,000 to about 500,000.

h. Polyvinyl acetate, and hydrolysis derivatives thereof such as polyvinyl formal and polyvinyl butyral. The derivatives preferably contain less than 20 percent unreacted hydroxyl groups. The preferred average molecular weight is from about 12,000 to about 50,000.

i. Linear polyesters, such as polyethyleneglycol adipate and polypropyleneglycol maleate. The preferred average molecular weight is from about 3,000 to about 10,000.

j. Linear polyurethanes, such as the reaction product of organic diisocyanates, such as toluenediisocyanate and naphthylene diisocyanate, with dihydroxy compounds, such as low molecular weight polyethers or polyesters. The preferred average moleuclar weight is from about 3,000 to about 50,000.

k. Suitable mixtures of any of the above materials.

It is understood that the above-defined thermoplastic polymers are only exemplary of the polymers which may be used in preparing the products of this invention. As disclosed above, the solubility characteristics of the liquid anaerobic adhesive in the polymer, and the ability of the polymer to retain its structural integrity upon being plasticized with the liquid anaerobic adhesive, ultimately determine the full range of polymers which can be used. All polymers meeting the above-described requirements are considered to be within the scope of this invention. For example, additional classes of thermoplastic polymers which have been found useful in this invention are polystyrene, cumarone indene resins, phenoxy resins and various resins prepared from hydrophilic modified olefins. However, it has been found that the classes of thermoplastic polymers designated (a), (b) and (d) above produce adhesive thermoplastic compositions with particularly desirable properties. The most highly desirable thermoplastic polymers have been found to be the cellulose acetate butyrate polymers.

In addition to the thermoplastic polymer and anaerobic adhesive mixture, the products of this invention can contain any other ingredients which do not change materially the anaerobic adhesive and non-flowable characteristics of the final product. Examples of such additional ingredients are coloring agents, additional plasticizers, fillers and the like. Preferably these additional ingredients do not comprise more than about 25 percent by weight of the final adhesive thermoplastic product.

The adhesive thermoplastic products of this invention can be prepared in a number of ways. For example, a sheet of many of the thermoplastic polymers, if contacted with a liquid anaerobic adhesive, will imbibe an adequate amount of the liquid. The preferred manner of preparation, however, involves the use of a "mutual" solvent, i.e., a volatile solvent in which both the thermoplastic polymer and the liquid anaerobic adhesive are soluble or dispersible. After an intimate mixture or dispersion of the polymer and adhesive in the solvent is obtained, the solvent is removed by evaporation. Vacuum or moderate heat can be used to aid in removal of the solvent. When vacuum is used, care must be taken to insure that the time during which the vacuum is applied is relatively short —such as about fifteen minutes or less. At relatively high degrees of vacuum, insufficient amounts of oxygen are present to prevent the anaerobic adhesive from beginning to polymerize. Likewise, when heat is applied to aid in removal of the solvent, the temperature should not be allowed to exceed about 140°F. since polymerization frequently will begin at temperatures above this level even in the presence of oxygen.

Typical solvents which have been found useful in this regard are chlorinated and/or fluorinated hydrocarbons, such as methylene chloride, trichloroethane and trichlorotrifluoroethane, and lacquer type solvents such as acetone, methyl ethyl ketone and butyl acetate.

By use of the above-described technique, substantial flexibility is obtained in the production of desirable finished products within the scope of the invention disclosed herein. For example, the solution of the thermoplastic polymer and the anaerobic adhesive mixture can be spread into layers of predetermined thickness. Upon evaporation of the solvent, sheets of the product of this invention are formed. In thin films, e.g., from about 5 to about 75 mils thickness, the sheet product effectively can be used as an adhesive lamina. These thin films, and even somewhat thicker ones (such as up to about one-quarter inch in thickness), effectively can be used as adhesive gaskets. The gasket application is a particularly desirable one. Not only is an excellent seal provided due to the adhesive properties of the gasket, but, since a hard, durable sheet forms upon curing of the adhesive, the gasket is not subject to "relaxation" upon aging as is true with rubber and related gasket materials.

The mixture of thermoplastic polymer and liquid anaerobic adhesive in the mutual solvent also can be used conveniently to apply coatings to various pieces, such as nuts, bolts, screws and other threaded fasteners, bearings, bushings and many other items which are destined to be affixed or positioned in a specific place or configuration. Application can be by any conventional method for applying liquid adhesives, such as by brushing, spraying, dipping, and by use of apportioning applicators designed for metering precise amounts of liquids and dispensing them to a specific location. After application, the solvent is removed by evaporation leaving the non-flowable anaerobic adhesive as a surface coating.

The coating materials described herein have particular utility when applied to threaded members. Frequently pipe, pipe fittings, bolts, studs, etc. need to be sealed to prevent leakage, or locked by some means to prevent loosening due to vibration. The adhesive coatings of this invention conveniently can be preapplied to such products. In use, the coating will cure to provide both the sealing and locking function. The need to use an external or separately applied sealing or locking device is avoided.

The products of the invention disclosed herein, regardless of whether in their natural or preapplied form, are shelf stable items capable of withstanding normal storage and shipping conditions. They will not cure (polymerize) as long as maintained in reasonably thin sheets (such as about one-half inch or less) and in contact with air or other supplies of oxygen. But when confined between non-porous surfaces or otherwise placed in an oxygen free atmospher, curing of the adhesive will begin. Even though compositions within the scope of this invention easily can be made which do not appear moist or tacky to the touch, surprisingly they have been found to produce strong, durable adhesive bonds when used as described herein. The exact reason for this unexpected benefit is not known with particularity, but it is felt that the compressive forces exerted on the normally non-flowable anaerobic adhesive product during use causes sufficient distortion in the product and such intimate contact between the product and the surfaces to be bonded that effective adhesive bonds are formed.

While curing will take place at room temperature and in the absence of accelerators, the time required to achieve adhesive bonding can be shortened by subjecting the assembly containing the adhesive thermoplastic product to moderate temperatures, such as from about 125°F. to about 250°F., or by treating the adhesive or one or more of the surfaces to be bonded with a polymerization accelerator immediately before the assembly operation. A typical class of such accelerators (organic polyamines) is disclosed in U.S. Pat. No. 3,203,941 to Vernon K. Krieble, issued Aug. 31, 1965.

EXAMPLES

The following Examples are given to demonstrate typical compositions within the scope of the invention disclosed herein, and methods of preparation and use of these compositions. The Examples are not intended to be limitations upon the invention. Unless stated to the contrary, all ratios and percentages in the Examples are on a weight basis.

EXAMPLE I

A polymerizable liquid anaerobic adhesive system was prepared by mixing the ingredients described in Table I in the approximate proportion indicated.

TABLE I

| Ingredient | Weight (%) |
|---|---|
| Polyethyleneglycol dimethacrylate (avg. Molecular weight=330) | 96.3 |
| Cumene hydroperoxide | 3.0 |
| Latent accelerator (dimethyl-p-toluidine and benzoylsulfimide in a weight ratio of 4:3) | 0.7 |
| Stabilizer (quinone) | 100 parts per million by weight |
| | 100.0 |

This mixture (hereafter in these examples referred to as "the anaerobic adhesive") then was used in the preparation of thermoplastic sheets having anaerobic adhesive properties. The thermoplastic sheets were prepared from compositions made by dissolving a thermoplastic polymer and the anaerobic adhesive in a mutual solvent (methylene chloride), and then spreading the solution in a thin layer to allow the solvent to evaporate.

Compositions I through V inclusive were prepared using a high molecular weight cellulose acetate butyrate thermoplastic resin. The resin had a solution viscosity (ASTM No. D1343-54T) of 15 to 35 seconds. The weight percent acetate was 21 percent, the weight percent butyrate was 26 percent, and the weight percent hydroxyl was 2.5 percent. The formulations for Compositions I through V are given below in Table II, all figures being expressed on a parts by weight basis.

TABLE II

| Composition | Celluse Acetate Butyrate Resin | Anaerobic Adhesive | Solvent (CH₂Cl₂) |
|---|---|---|---|
| I | 10 | 90 | 100 |
| II | 20 | 80 | 200 |
| III | 40 | 60 | 250 |
| IV | 60 | 40 | 350 |
| V | 80 | 20 | 350 |

Approximately 25 milliliters of each of Compositions I through V above were poured onto separate sheets of wax paper and allowed to stand overnight to permit the methylene chloride to evaporate. In each case the resultant product, after evaporation of the methylene chloride, was a clear sheet of about 1/16 inch thickness. The sheets varied incrementally in texture from weak and tacky (Composition I) to hard and slightly brittle (Composition V). Each sheet easily could be cut or stamped into a given form or configuration.

The sheets described in the above Example possess anaerobic adhesive properties, as clearly can be shown by placing a portion of the sheet between metal or other non-porous surfaces and clamping the assembly firmly together. Upon examining the assembly after a reasonable period of time, such as 24 hours, the assembly is found to be securely bonded in place. After cure the original soft, pliable sheet material is found to be converted to a hard, durable one, thus showing the utility of the product described herein for use as a gasketing material. The firm bonds between the cured sheet and the metal or other non-porous surfaces indicate that an excellent seal is attained. Further, the hardness and durability of the cured sheet indicates there would be no "relaxation" in the assembly after a period of time as is common in assemblies having customary gaskets.

EXAMPLE II

The anaerobic adhesive of Example I, above, was used in conjunction with a high molecular weight (in excess of 500,000) polyethylmethacrylate thermoplastic resin in preparing a second series of thermoplastic sheets possessing anaerobic curing characterstics. The thermoplastic resin had an inherent viscosity of 0.91. Sheets were prepared by the method described in Example I, again using methylene chloride as the mutual solvent. The approximate compositions of the solutions from which the sheets were made were as follows, all figures being expressed as parts by weight.

TABLE III

| Composition | Polymethylmethacrylate Resin | Anaerobic Adhesive | Solvent (CH₂Cl₂) |
|---|---|---|---|
| VI | 40 | 60 | 200 |
| VII | 60 | 40 | 300 |
| VIII | 80 | 20 | 350 |

Approximately 25 milliliters of each of Compositions VI through VIII inclusive were spread on wax paper and left overnight to form a sheet possessing anaerobic adhesive properties, as described in Example I. Upon examination after the methylene chloride had evaporated, the three sheets were found to be clear, pliable materials. They varied in texture from a soft, slightly tacky material in the sheet produced from Composition VI, to a firm, non-tacky material produced from Composition VIII.

The sheets produced in Example II possessed substantially the same anaerobic adhesive properties and characteristics as those sheets described in Example I, above.

EXAMPLE III

Compositions I through VIII of Examples I and II, above, were used as bolt sealants in the following manner. The threaded portion of a series of Standard ⅜ inch bolts were dipped into the portion of each Composition which had not been used for preparation of thermoplastic sheets, as described in Examples I and II, above. The excess liquid was allowed to drain from the end of the bolts, and then the bolts were set aside to permit the methylene chloride to evaporate. After evaporation of the solvent, examination of the threaded portion of the bolts disclosed the presence of a residual thermoplastic coating which was substantially identical in physical appearance and texture to the respective thermoplastic sheets described in Examples I and II, above.

A mating nut was assembled onto each of the above-described bolts. Compositions I, II, III and VI were found to leave thin uniform coatings on the bolts, and the coatings offered substantially no resistance to the assembly of the nut onto the bolt. In each case the nut could be assembled onto the bolt without the use of a wrench or, if a wrench was required, a torque of substantially less than 1 ft.-lb. was required to complete the assembly. After allowing 24 hours for the anaerobic cure to take place, the torque required to remove the nut from the bolt was determined, measuring both the "break-loose" and "prevailing" torques. Break-loose torque is the amount of torque required to produce the first relative movement between the nut and bolt. Prevailing torque is the torque required to produce continuing relative movement between the nut and bolt, specifically the average torque required to produce one full revolution of the nut. The results are tabulated below in Table IV, each figure being the average of three samples.

TABLE IV

| Composition | Break-loose Torque | Prevailing Torque |
|---|---|---|
| I | 4 ft. - lbs. | 8 ft. -lbs. |
| II | 2 ft. -lbs. | 4 ft. -lbs. |
| III | 3 ft. -lbs. | 4 ft. -lbs. |
| VI | 7 ft. -lbs. | 9 ft. -lbs. |

On the other hand, it was found that the coatings prepared from Compositions IV, VII and VIII were too thick as applied. (Substantially all of the threaded area was filled with the thermoplastic coating material.) The torque required to assemble the nuts onto the bolts in each instance was at least 4 foot-pounds. Since this assembly torque is too high for most commercial applications, the removal torque was not measured.

When in the above Example, thinner coatings of the thermoplastic material (such as uniform ten mil coatings over the entire threaded area), are applied from Compositions IV, V, VII and VIII (as when twice the indicated amount of methylene chloride is used), results are obtained which are comparable to those obtained from coatings prepared from Compositions I, II, III and VI. Assembly torques are less than about 1 foot-pound and removal torques of 2 foot-pounds and above are realized.

EXAMPLE IV

A polymerizable liquid anaerobic adhesive system was prepared exactly as described in Example I, except that hexamethylene dimethacrylate was substituted for the polyethylene glycol dimethacrylate. 60 parts by weight of this adhesive system and forty parts by weight of the cellulose acetate butyrate described in Example I were mixed in approximately 250 parts by weight of methylene chloride. A portion of this mixture was used to prepare a sheet possessing anaerobic adhesive properties by the method described in Example I. A portion of the remainder was used to coat three Standard ⅜ inch bolts, as described in Example III.

After the methylene chloride had evaporated from the coating placed on the bolts, the bolts were assembled with mating nuts; the assembly was easily completed by hand without the use of a wrench or other tools. On the following day the torque required to remove the nuts from the bolts was determined. The break-loose torque was found to be 4 ft.-lbs. and the prevailing torque was 9 ft.-lbs.

A one-inch square section of the sheet material of this Example was firmly clamped between the overlapping ends of one-inch wide shear strips. After allowing 24 hours for the anaerobic cure to take place, the shear force required to separate the two lap strips was determined using Research Products Co. Model RPC laboratory tensile tester. It was found that a shear force of 1,000 psi was requred to separate the lap strips, thus further demonstrating the adhesive properties of the thermoplastic sheet material.

EXAMPLE V

A variety of thermoplastic resins which have varying but acceptable degrees of compatibility with acrylate-type anaerobic adhesives were used to prepare sheet materials plasticized with anaerobic adhesive. In each case the anaerobic adhesive and the method of preparation were as described in Example I above. The type of thermoplastic resin and the approximate amounts of thermoplastic resin, anaerobic adhesive and methylene chloride used in the Compositions from which the various adhesive sheet materials were prepared are set forth in Table V below. All figures are expressed in parts by weight.

TABLE V

| Composition | Type of thermoplastic resin | Amount resin | Amount anaerobic adhesive | Amount solvent ($CH_2Cl_2$) | Characteristics of sheet produced |
|---|---|---|---|---|---|
| X | Petroleum hydrocarbon resin; avg. molecular weight=900; iodine number=100. | 80 | 20 | 350 | Clear, firm, non-tacky sheet. |
| XI | Polystyrene; avg. molecular weight=21,000. | 90 | 10 | 400 | Clear, very firm, non-tacky sheet. |
| XII | Coumarone-indene resin avg. molecular weight=800. | 90 | 10 | 400 | Do. |
| XIII | Styrene-acrylate copolymer 80 weight percent styrene; 20 weight percent acrylate; avg. molecular weight=21,000. | 90 | 10 | 400 | Opaque, very firm, non-tacky sheet. |
| XIV | Phenoxy resin. | 90 | 10 | 800 | Clear, firm, somewhat brittle, non-tacky sheet. |
| XV | Polyvinyl formal (avg. molecular weight=21,000) | 90 | 10 | 800 | Clear, very firm, non-tacky sheet. |
| XVI | Cellulose-acetate-butyrate of Example I | 40 | 60 | 300 | Clear, soft, non-tacky sheet. |
| XVII | Polyethyl methacrylate of Example II | 60 | 40 | 300 | Clear, soft, slightly tacky sheet. |
| XVIII | Acrylonitrile-butadiene-styrene copolymer; specific gravity=1.07; Moody "400" Flow=50; Rockwell "R" hardness=118. | 40 | 60 | 150 | Clear, soft, tacky sheet. |

All of the sheet products prepared as described in Example V possess anerobic adhesive characteristics, i.e., will cure in the absence of air (oxygen), as described in Examples I through IV above. All of these materials can be used as gaskets if in appropriate thicknesses; as adhesives lamina if in film form; or, if in thin coatings, as sealants for nuts and bolts, studs, screws, or other mechanical fasteners. They also can be used in most other applications where the bonding of non-porous surfaces is required.

When, in one or more of Compositions X through XVIII above, the polyethylene glycol dimethacrylate anaerobic adhesive is replaced in whole or in part by hydroxyethyl methacrylate, t-butylamino methacrylate, dipropylene glycol dimethacrylate, diglycerol diacrylate, diglycerol trimethacrylate, neopentyl-glycol diacrylate, tetraethylene glycol di(chloroacrylate), or trimethylol propane triacrylate; and/or cumene hydroperoxide is replaced in whole or in part by tertiary butyl hydroperoxide or methyl ethyl ketone hydroperoxide; substantially similar results are obtained in that thermoplastic sheets are produced which possess the anaerobic adhesive characteristics described above.

Further, when in one or more of Compositions X through XVIII above, the indicated thermoplastic resin is replaced in whole or in part by one or more of the following thermoplastic polymers: polymethyl acrylate; polymethyl chloroacrylate; polypropyl methacrylate;

cellulose acetate propionate; butadiene-styrene copolymer; polyvinyl chloride; polyvinyl choride-polyvinyl acetate copolymer; polyvinylidine chloride-polyvinyl acetate copolymer; ethyl cellulose; hydroxyethyl cellulose; methyl cellulose; polyvinyl acetate; polyvinyl-butyral; polyethylene glycol adipate; and polypropylene glycol maleate, the thermoplastic polymer or mixture thereof being of sufficient average molecular weight to render the final adhesive thermoplastic product non-flowable at 75°F.; substantially similar results are obtained in that thermoplastic sheets are produced which possess the anaerobic adhesive characteristics described above.

We claim:

1. An article comprising an air-impermeable surface for entering sealed engagement with a mating surface, said air-impermeable surface being coated with an adhesive coating composition, said adhesive coating composition comprising a normally non-flowable thermoplastic polymer plasticized with a liquid anaerobic adhesive system which comprises a mixture of a polymerizable acrylate ester monomer and a peroxy polymerization initiator therefor, said initiator being present in an amount sufficient to polymerize said monomer at room temperature in the substantial absence of oxygen, said liquid anaerobic adhesive system comprising from about 5 percent to about 80 percent by weight of said adhesive coating composition and being present in an amount insufficient to render said adhesive coating composition flowable at 75°F.

2. An article comprising an air-impermeable surface for entering sealed engagement with a mating surface, said air-impermeable surface being coated with an adhesive coating composition which comprises a normally non-flowable thermoplastic polymer having dissolved therein from about 5 percent to about 80 percent by weight of said adhesive coating composition of a liquid anaerobic adhesive system comprising a mixture of a polymerizable acrylate ester monomer and from about 0.1 percent to about 20 percent by weight of said mixture of a peroxy polymerization initiator for said monomer, said liquid adhesive system being present in an amount insufficient to render the composition flowable at 75°F.

3. The article of claim 2 wherein the peroxy polymerization initiator is an organic hydroperoxide.

4. The article of claim 2 wherein the polymerizable acrylate ester is a polymerizable polyacrylate ester monomer, and the peroxy initiator is an organic hydroperoxide.

5. The article of claim 2 wherein the liquid anaerobic adhesive system comprises from about 10 percent to about 60 percent by weight of the coating composition.

6. The article of claim 2 wherein the normally non-flowable thermoplastic polymer is selected from the classes consisting of the following: (a) acrylate polymers having an average molecular weight between about 5,000 and 500,000; (b) cellulose esters having an average molecular weight between about 50,000 and about 500,000; (c) butadiene-styrene copolymers having an average molecular weight between about 5,000 and about 500,000; (d) acrylonitrile-butadiene-styrene copolymers having an average molecular weight between about 5,000 and about 100,000; (e) vinyl chloride polymers having an average molecular weight between about 10,000 and about 500,000; (f) copolymers of either vinyl chloride or vinylidine chloride with vinyl acetate, having an average molecular weight between about 10,000 and about 500,000; (g) cellulose ethers having an average molecular weight between about 50,000 and about 500,000; (h) vinyl acetate polymers, and hydrolysis derivatives thereof, having an average molecular weight between about 12,000 and about 50,000; (i) linear polyesters having an average molecular weight between about 3,000 and about 10,000; (j) linear polyurethanes having an average molecular weight between about 3,000 and about 50,000; and (k) mixtures of any of (a) through (j).

7. The article of claim 6 wherein the polymerizable acrylate ester has the general formula:

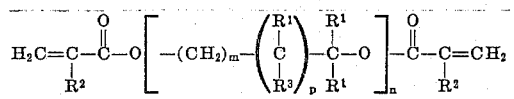

wherein $R^1$ represents a radical selected from the group consisting of hydrogen, lower alkyl of from one to about four carbon atoms, hydroxy alkyl of from one to about four carbon atoms, and

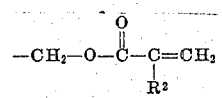

$R^2$ is a radical selected from the group consisting of hydrogen, halogen, and lower alkyl of from one to about four carbon atoms; $R^3$ is a radical selected from the group consisting of hydrogen, hydroxyl, and

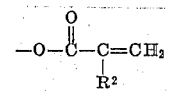

$m$ is an integer equal to at least 1; $n$ is an integer equal to at least 1; and $p$ is one of the following: 0, 1.

8. The article of claim 2 wherein the composition is non-flowable at 100°F.

9. A threaded article prepared from an air-impermeable substance, at least a portion of the threaded area of said article being coated with an adhesive coating composition which comprises a normally non-flowable thermoplastic polymer having dissolved therein from about 5 percent to about 80 percent by weight of said adhesive coating composition of a liquid anaerobic adhesive system comprising a mixture of a polymerizable acrylate ester monomer and from about 0.1 percent to about 20 percent by weight of said mixture of a peroxy polymerization initiator for said monomer, said liquid adhesive system being present in an amount insufficient to render the adhesive coating composition flowable at 100°F.

10. The threaded article of claim 9 wherein said article is a metallic threaded fastener.

11. The threaded article of claim 9 wherein the article is a metallic threaded pipe or pipe fitting.

* * * * *